(12) United States Patent
Van Steijn et al.

(10) Patent No.: US 9,532,579 B2
(45) Date of Patent: Jan. 3, 2017

(54) PROCESSING AND/OR INSPECTION LINE FOR POULTRY SUSPENDED BY THE LEGS

(71) Applicant: Meyn Food Processing Technology B.V., Oostzaan (NL)

(72) Inventors: Aloysius Christianus Maria Van Steijn, Oostzaan (NL); Jaco Gardenier, Oostzaan (NL); Rick Sebastiaan Van Stralen, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 15/070,561

(22) Filed: Mar. 15, 2016

(65) Prior Publication Data
US 2016/0278395 A1  Sep. 29, 2016

(30) Foreign Application Priority Data

Mar. 25, 2015 (NL) .................................... 2014523

(51) Int. Cl.
*A22C 21/00* (2006.01)

(52) U.S. Cl.
CPC ....... *A22C 21/0053* (2013.01); *A22C 21/0007* (2013.01)

(58) Field of Classification Search
CPC ...... A22B 7/001; A22C 21/0053; A22C 21/06
USPC ................................................. 452/177–180
See application file for complete search history.

(56) References Cited

U.S. PATENT DOCUMENTS

| 3,559,233 | A |   | 2/1971  | Bottomley |            |
|-----------|---|---|---------|-----------|------------|
| 4,282,623 | A | * | 8/1981  | Gacuzana  | A46B 13/06 |
|           |   |   |         |           | 15/230.17  |
| 4,570,295 | A | * | 2/1986  | van Mil   | A22C 21/0053 |
|           |   |   |         |           | 452/182    |
| 4,660,256 | A | * | 4/1987  | Innes     | A22C 21/0053 |
|           |   |   |         |           | 452/167    |
| 4,675,943 | A | * | 6/1987  | Tabata    | A22C 21/0053 |
|           |   |   |         |           | 198/680    |
| 4,709,448 | A | * | 12/1987 | McGuire   | A22C 21/0053 |
|           |   |   |         |           | 452/167    |
| 5,026,317 | A |   | 6/1991  | Kennedy   |            |
| 5,134,971 | A | * | 8/1992  | Krienke   | A01K 45/00 |
|           |   |   |         |           | 119/713    |

(Continued)

FOREIGN PATENT DOCUMENTS

| EP | 0530868 | 3/1993 |
|----|---------|--------|
| NL | 8501812 | 1/1987 |

OTHER PUBLICATIONS

PCT Search Report dated May 23, 2015 for application 2014523.

*Primary Examiner* — Richard Price, Jr.
(74) *Attorney, Agent, or Firm* — Dority & Manning, P.A.

(57) ABSTRACT

A processing line, inspection line, or both, includes a first conveyor line with shackles for suspending the poultry by the legs. The conveyor line is arranged to move the poultry in a conveying direction passed a processing and/or inspection station for the poultry, wherein at least along a part of the conveyor line an endless belt is provided that supports the shackles and moves the shackles sideways away from a first neutral vertical suspension position to a second position in which the shackles are suspended obliquely in the conveyor line so as to arrange that any back-and-forth movement of the shackles in their conveying direction is prevented or counteracted.

6 Claims, 1 Drawing Sheet

(56) References Cited

U.S. PATENT DOCUMENTS

| | | | | |
|---|---|---|---|---|
| 5,340,351 A * | 8/1994 | Minderman | ....... | A22C 21/0053 |
| | | | | 452/182 |
| 5,875,738 A * | 3/1999 | Hazenbroek | ....... | A22C 21/0007 |
| | | | | 119/716 |
| 5,947,811 A * | 9/1999 | Hazenbroek | ....... | A22C 21/0023 |
| | | | | 452/154 |
| 6,152,816 A * | 11/2000 | van den Nieuwelaar | ............ | A22C 21/06 |
| | | | | 198/465.1 |
| 6,467,668 B1 * | 10/2002 | Basile, II | ................ | A22C 11/00 |
| | | | | 226/104 |
| 6,523,462 B1 * | 2/2003 | Johnson | ................ | A22C 15/001 |
| | | | | 198/433 |
| 8,500,523 B1 * | 8/2013 | Hart | .................... | A22C 17/002 |
| | | | | 452/154 |
| 2012/0205220 A1 | 8/2012 | Krebs | | |
| 2013/0240328 A1 | 9/2013 | Nukui | | |

\* cited by examiner

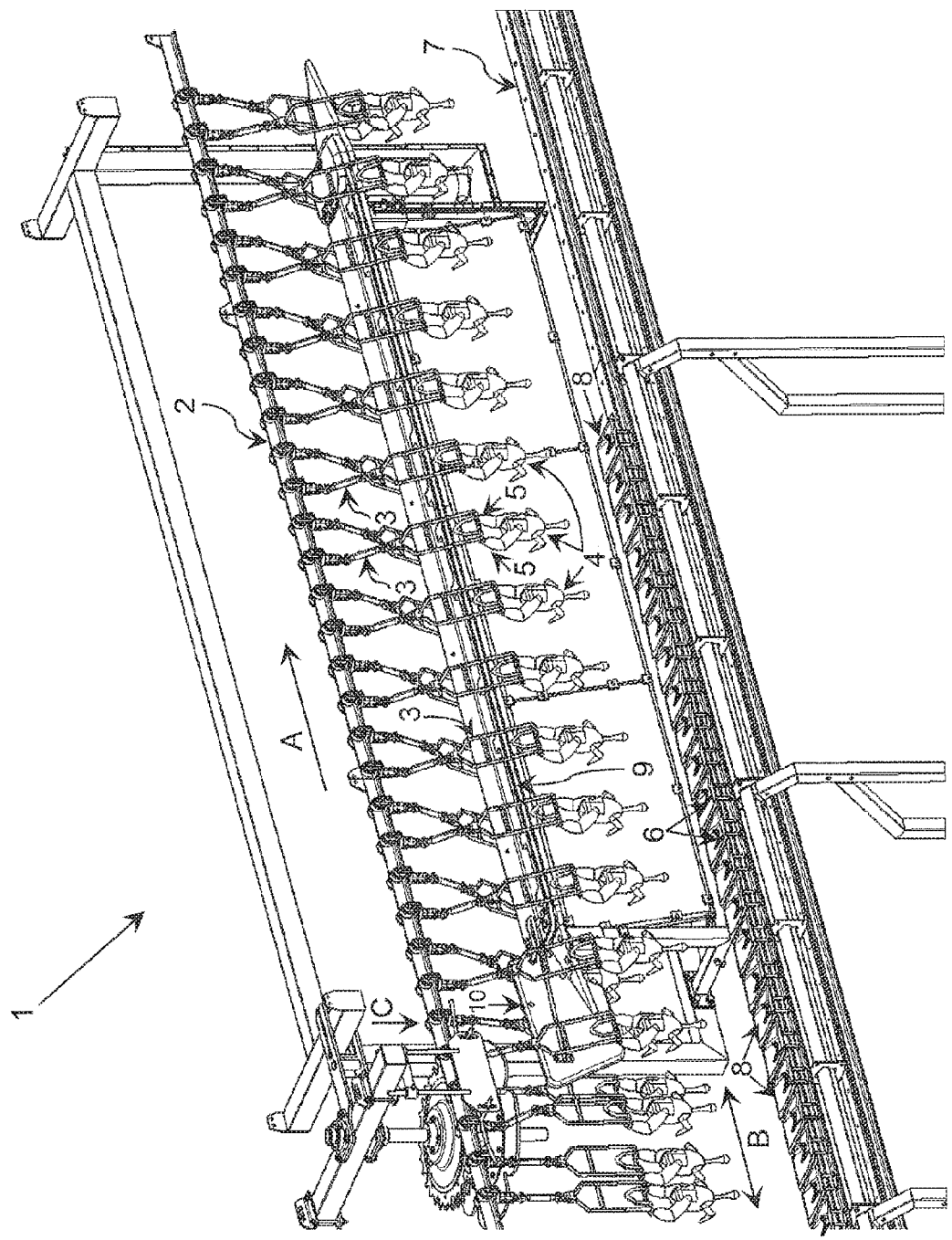

PROCESSING AND/OR INSPECTION LINE FOR POULTRY SUSPENDED BY THE LEGS

PRIORITY STATEMENT

The present application claims priority under 35 U.S.C. §119 to Dutch Application No. 2014523, filed Mar. 25, 2015.

FIELD OF THE INVENTION

The subject matter of the present disclosure relates to a processing line, an inspection line, or both, for poultry.

BACKGROUND OF THE INVENTION

A processing and/or inspection line provided with an inspection station is disclosed in European patent EP 0 530 868 in the name of the applicant. In this patent, an apparatus for processing poultry is proposed, including a suspension conveyor for conveying the birds with the legs suspended therefrom. A processing station is disposed along a portion of the suspension conveyor, having processing means for removing the entrails from the abdominal cavity as the birds are conveyed by the suspension conveyor. A further conveyor synchronously driven with the suspension conveyor is disposed substantially parallel to and at a predetermined distance from a portion of the suspension conveyor. The further conveyor is disposed after the processing apparatus for receiving the separated entrails and conveying the entrails along the inspection station at the same time as the corresponding birds are carried by the suspension conveyor along the inspection station.

With the currently applied high speeds of the conveyor line for the poultry, conveying approximately 6000 birds or more per hour, a problem may occur where the poultry starts swinging in the conveyor line, and this is not because they are enjoying themselves. In particular, the birds start swinging back-and-forth in the conveying direction of the conveyor line, which may result in inadequate processing of the poultry by a processing station adjacent the line, or unreliable inspection of the poultry and the entrails by a veterinary inspector standing next to the line, since due to the swinging the one-on-one correspondence between the poultry and the entrails is lost. Another problem in the latter situation is that moisture and/or body fluids like blood may drip from a bird to entrails that belong to another bird resulting in contamination which should be avoided.

SUMMARY OF THE INVENTION

In one exemplary aspect, the invention aims at providing a solution to the above described problems, and in connection therewith proposes to provide a processing and/or inspection line having the features of one or more of the appended claims.

According to an exemplary embodiment of the invention, at least along a part of a conveyor line, an endless belt is provided that supports the shackles and maintains the shackles sideways deflected in a second position away from a first neutral vertical suspension position, in which second position the shackles are suspended obliquely in the conveyor line whilst being supported and resting against the endless belt so as to arrange that any back-and-forth movement of the shackles in their conveying direction is prevented or counteracted.

Certain exemplary objects of the invention are particularly promoted in an exemplary aspect by arranging that the endless belt has a superficial roughening and/or toothing, preferably equipped to receive a framework of the shackles, in particular the arms of the shackles.

Suitably further the endless belt is driven synchronously with the conveyor line in an exemplary embodiment.

Although the invention is applicable in any situation in which the back-and-forth movement of the shackles in the movement direction of the conveyor line is to be avoided, the advantages and benefits of the invention particularly come to their fullest potential in an exemplary processing and/or inspection line wherein at least at the inspection station a second conveyor line is provided with receptacles for receiving intestines therein that are taken from the poultry suspended by the legs in the shackles of the first conveyor line, and wherein the second conveyor line is arranged to move synchronously with the first conveyor line for maintaining a one-to-one correspondence between the poultry in a shackle of the first conveyor line, and the intestines received in the receptacle in the second conveyor line immediately below the poultry in the first conveyor line.

In another exemplary embodiment, at an entrance of the inspection station guiding means, preferably guide bars are provided to guide the shackles from the first neutral vertical suspension position to a second position in which the shackles are suspended obliquely in the conveyor line.

The invention will hereinafter be further elucidated with reference to the drawing of an exemplary embodiment of an apparatus according to the invention that is not limiting as to the appended claims.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figure, in which:

FIG. 1 shows a part of a processing and/or inspection line according to an exemplary aspect of the invention.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The skilled person knows that a processing line for poultry may extend over a considerable length and be closed in itself in an endless loop. It is not practical and unnecessary to show such a complete processing line. Instead, and sufficient for elucidation of the invention, FIG. 1 shows only a part of the processing and/or inspection line 1 of an exemplary embodiment of the invention.

The part of the processing and/or inspection line 1 of the exemplary embodiment of the invention shown in FIG. 1 includes a first conveyor line 2 with shackles 3 for suspending the poultry 4 by the legs 5. The conveyor line 2 can be a chain conveyor or any other suitable type of conveyor and is arranged to move the poultry 4, in a conveying direction A, past a processing station and/or inspection station for the poultry 4. In the embodiment shown in FIG. 1 an inspection station is shown.

At an inspection station a veterinary inspector (not shown and not part of the inspection station) makes a visual check on the poultry 4 and the intestines 6 that are taken out from the poultry to establish whether except from being dead, the poultry and their intestines 6 are sound and healthy. To make a reliable inspection possible, the inspection station as shown in FIG. 1 is embodied with a second conveyor line 7 that is provided with receptacles 8 for receiving therein the intestines 6 that are taken from the poultry 4 that is suspended by the legs 5 in the shackles 3 of the first conveyor line 2. The said second conveyor line 7 is arranged to move synchronously with the first conveyor line 2 for maintaining a one-to-one correspondence between a particular poultry 4 in a shackle 3 of the first conveyor line 2, and the intestines 6 received in the receptacle 8 in the second conveyor line 7, which receptacle 8 is immediately below said poultry 4 in the first conveyor line 2. In this way, establishing whether the poultry should be considered sound and healthy or not can be reliably made on the face value of either the poultry itself or its intestines 6 that are taken out from it.

According to the exemplary embodiment of the invention, at least along a part of the conveyor line 2 an endless belt 9 is provided that supports the shackles 3 and maintains the shackles 3 in a second position (in the figure at the right-hand part of point C) sideways deflected away from a first neutral vertical suspension position (shown in region B), in which second position the shackles 3 are suspended obliquely in the conveyor line 2 whilst being supported and resting against the endless belt 9. The arrangement of the shackles 3 being supported and resting against the endless belt 9 causes that any back-and-forth movement of the shackles 3 in their conveying direction A is prevented or counteracted. To promote this purpose, the endless belt 9 preferably has a superficial roughening and/or toothing. Desirably the toothing in the endless belt 9 is equipped to receive the framework of the shackles 3, in particular its arms.

It is further remarked that the endless belt 9 is driven synchronously with the conveyor line 2 and that at an entrance C of the inspection station guiding means 10, preferably guide bars, are provided to guide the shackles 3 from the first neutral vertical suspension position to a second position in which the shackles 3 are suspended obliquely in the conveyor line 2.

Although the invention has been discussed in the foregoing with reference to an exemplary embodiment of the processing and/or inspection line of the invention, the invention is not restricted to this particular embodiment which can be varied in many ways without departing from the gist of the invention. The discussed exemplary embodiment shall therefore not be used to construe the appended claims strictly in accordance therewith. On the contrary, the exemplary embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. A processing or inspection line for poultry, comprising
a first conveyor line including shackles for suspending poultry by the legs, wherein the conveyor line is arranged to move the poultry in a conveying direction past a processing station, inspection station, or both, for the poultry; and
an endless belt along at least a part of the first conveyor line, the endless belt supporting the shackles and maintaining the shackles sideways deflected in a second position away from a first neutral vertical suspension position, in which second position the shackles are suspended obliquely in the first conveyor line whilst being supported and resting against the endless belt so as to arrange that any back-and-forth movement of the shackles in their conveying direction is prevented or counteracted;
wherein the first conveyor line is arranged to move the poultry in a conveying direction past an inspection station, and wherein at least at the inspection station a second conveyor line is provided with receptacles for receiving intestines therein that are taken from the poultry suspended by the legs in the shackles of the first conveyor line, wherein the second conveyor line is arranged to move synchronously with the first conveyor line for maintaining a one-to-one correspondence between the poultry in a shackle of the first conveyor line, and the intestines received in the receptacle in the second conveyor line, which receptacle is immediately below the poultry in the first conveyor line.

2. The processing or inspection line for poultry as in claim 1, wherein the endless belt has a superficial roughening, toothing, or both, and is equipped to receive a framework of the shackles.

3. The processing or inspection line for poultry as in claim 1, wherein the endless belt has a superficial roughening, toothing, or both, and is equipped to receive arms of the shackles.

4. The processing or inspection line for poultry as in claim 1, wherein the endless belt is driven synchronously with the conveyor line.

5. The processing or inspection line for poultry as in claim 1, wherein at an entrance of the inspection station, guiding means are provided to guide the shackles from the first neutral vertical suspension position to a second position in which the shackles are suspended obliquely in the conveyor line.

6. The processing or inspection line for poultry as in claim 5, wherein the guiding means comprises guide bars.

* * * * *